United States Patent
Yamazaki et al.

(10) Patent No.: US 7,971,666 B2
(45) Date of Patent: Jul. 5, 2011

(54) SYSTEM AND METHOD OF EXTENDING REGENERATIVE BRAKING IN A HYBRID ELECTRIC VEHICLE

(75) Inventors: Mark Steven Yamazaki, Canton, MI (US); Deepa Ramaswamy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1017 days.

(21) Appl. No.: 11/766,057

(22) Filed: Jun. 20, 2007

(65) Prior Publication Data

US 2008/0314663 A1    Dec. 25, 2008

(51) Int. Cl.
*B60W 20/00* (2006.01)
(52) U.S. Cl. .............................. 180/65.265; 180/65.285
(58) Field of Classification Search ............. 180/65.265, 180/65.275, 65.28, 65.285, 65.29, 65.31; 903/930, 940, 941, 942, 943, 947; 303/152
See application file for complete search history.

(56) References Cited

U.S. PATENT DOCUMENTS

| | | | |
|---|---|---|---|
| 5,291,960 A | | 3/1994 | Brandenburg et al. |
| 5,988,307 A * | 11/1999 | Yamada et al. ............... 180/243 |
| 6,018,694 A * | 1/2000 | Egami et al. ................... 701/102 |
| 6,070,680 A * | 6/2000 | Oyama ....................... 180/65.25 |
| 6,124,690 A * | 9/2000 | Yano et al. ..................... 318/376 |
| 6,140,780 A * | 10/2000 | Oshima et al. ................. 318/139 |
| 6,338,391 B1 * | 1/2002 | Severinsky et al. ......... 180/65.23 |
| 6,369,531 B1 * | 4/2002 | Oshima et al. ................. 318/139 |
| 6,376,927 B1 * | 4/2002 | Tamai et al. ................. 290/40 C |
| 6,490,511 B1 * | 12/2002 | Raftari et al. .................... 701/22 |
| 6,554,088 B2 * | 4/2003 | Severinsky et al. ......... 180/65.23 |
| 6,603,278 B2 * | 8/2003 | Oshima et al. ................. 318/139 |
| 6,705,686 B2 * | 3/2004 | Hilbert ........................... 303/152 |
| 6,845,305 B1 * | 1/2005 | Raftari et al. .................... 701/22 |
| 6,915,198 B2 * | 7/2005 | Phillips et al. ................... 701/54 |
| 6,941,198 B2 * | 9/2005 | Brigham et al. ................. 701/22 |
| 7,223,203 B2 * | 5/2007 | Yamazaki et al. .............. 477/15 |
| 7,412,310 B2 * | 8/2008 | Brigham et al. ................. 701/22 |
| 7,520,353 B2 * | 4/2009 | Severinsky et al. ......... 180/65.28 |
| 7,565,938 B2 * | 7/2009 | Hisada et al. ................ 180/65.1 |
| 7,605,561 B2 * | 10/2009 | Yamazaki et al. ............. 320/104 |
| 2001/0039230 A1 * | 11/2001 | Severinsky et al. .............. 477/3 |
| 2002/0063540 A1 * | 5/2002 | Oshima et al. ................. 318/139 |
| 2003/0184156 A1 * | 10/2003 | Hilbert ........................... 303/152 |
| 2003/0217876 A1 * | 11/2003 | Severinsky et al. .......... 180/65.2 |
| 2004/0070270 A1 * | 4/2004 | Gunji ............................. 303/152 |
| 2005/0003925 A1 * | 1/2005 | Wakashiro et al. ............... 477/2 |
| 2005/0009665 A1 * | 1/2005 | Cho ................................... 477/5 |
| 2005/0055140 A1 * | 3/2005 | Brigham et al. ................. 701/22 |
| 2005/0164827 A1 * | 7/2005 | Beaty et al. ........................ 477/3 |
| 2005/0273225 A1 * | 12/2005 | Brigham et al. ................. 701/22 |

(Continued)

FOREIGN PATENT DOCUMENTS

GB    2344799    6/2000

(Continued)

*Primary Examiner* — Hau V Phan
*Assistant Examiner* — Jacob Meyer
(74) *Attorney, Agent, or Firm* — David B. Kelley; Alleman Hall McCoy Russell & Tuttle LLP

(57) ABSTRACT

A method of generating brake force to decelerate a vehicle is provided. The method includes during a deceleration condition, generating brake torque via a downstream electric energy conversion device to generate electric energy storable in the battery; and rotating the internal combustion engine via torque output from an upstream electric energy device to deplete electric energy from the battery.

20 Claims, 4 Drawing Sheets

U.S. PATENT DOCUMENTS

2006/0046893 A1* 3/2006 Yamazaki et al. .............. 477/2
2006/0061322 A1* 3/2006 Yamazaki et al. ............ 320/104
2008/0105477 A1* 5/2008 Abe ............................ 180/65.2
2008/0257619 A1* 10/2008 Yamazaki .................... 180/65.2
2008/0318728 A1* 12/2008 Soliman et al. ................... 477/4

FOREIGN PATENT DOCUMENTS

JP          2003/125501          4/2003

* cited by examiner

SYSTEM AND METHOD OF EXTENDING REGENERATIVE BRAKING IN A HYBRID ELECTRIC VEHICLE

BACKGROUND AND SUMMARY

A hybrid electric vehicle may perform regenerative braking operations during vehicle deceleration in order to capture and store energy that would otherwise be lost as a result of performing mechanical braking operations. In particular, during deceleration an electric energy conversion device (e.g. generator) may absorb kinetic energy generated as a result of the vehicle deceleration and may convert the kinetic energy to electric energy which may be used to increase the state of charge of a battery. Performing regenerative braking operations may be desirable beyond recouping energy because the hybrid electric vehicle may be decelerated with minimal or no negative torque supplied by the mechanical wheel brakes. Thus, reducing wear on the mechanical wheel brakes. During vehicle operation, regenerative braking may be in favor of mechanical braking via wheel brakes due to the battery being charged to capacity. Regenerative braking may be resumed when electric energy has been depleted from the battery so that the battery has room to store more electric energy. The incessant switching between regenerative braking and mechanical braking may be sensed by the vehicle operator and the vehicle operator may perceive the switching to be objectionable. Further, additional use of the mechanical wheels brakes may cause additional wear over time.

In one approach, regenerative braking operations may be extended by distributing excess electric energy to various vehicle systems for heating purposes. In particular, regenerative braking may be performed for a period after a battery has been charged to capacity by directing energy recouped from regenerative braking to a resistive heater in the coolant circuit of the internal combustion engine to heat the engine in order to improve emissions. Further, in a hybrid vehicle system, such as described in U.S. Pat. No. 6,574,535 for example, excess electric energy may be supplied to heat the passenger compartment heaters of the hybrid electric vehicle.

However, the inventors herein have recognized some issues relating to the above approach. Specifically, in some conditions, regenerative braking operations may be suspended after a period in order to prevent the engine coolant from overheating the engine or to prevent the vehicle cabin from becoming uncomfortably hot. Thus, although the above approach may extend regenerative braking capabilities for a period, eventually mechanical wheel brakes may be used earlier than desired to decelerate the vehicle In at least one approach described herein, at least some of the above issues may be addressed by a method of generating brake force to decelerate a vehicle comprising an internal combustion engine coupled to an input of a first electric energy device, the first electric energy device having an output coupled to a transmission device, and a second electric energy conversion device coupled downstream of the transmission device, the first and second electric energy conversion devices being powered at least by a battery, the method comprising: during a deceleration condition, generating brake torque via the second electric energy conversion device to generate electric energy storable in the battery while rotating the internal combustion engine via torque output from the first electric energy device to deplete electric energy from the battery.

In this way, regenerative braking may be performed to decelerate the hybrid vehicle even for an extended period to further reduce usage of mechanical wheel braking operations.

As a non-limiting example, regenerative braking operations may be performed for longer durations since once the battery is charged to capacity or a selected level, the first electric energy conversion device may be adjusted to deplete an amount of electric energy that tracks the amount of electric energy being created by the second electric energy conversion device in what may be considered a charge neutral state. Further, the amount of electric energy depleted may be adjusted based on the amount of electric energy generated to control the state of charge to a desired level during the braking operation.

DETAILED DESCRIPTION

Figure 1:
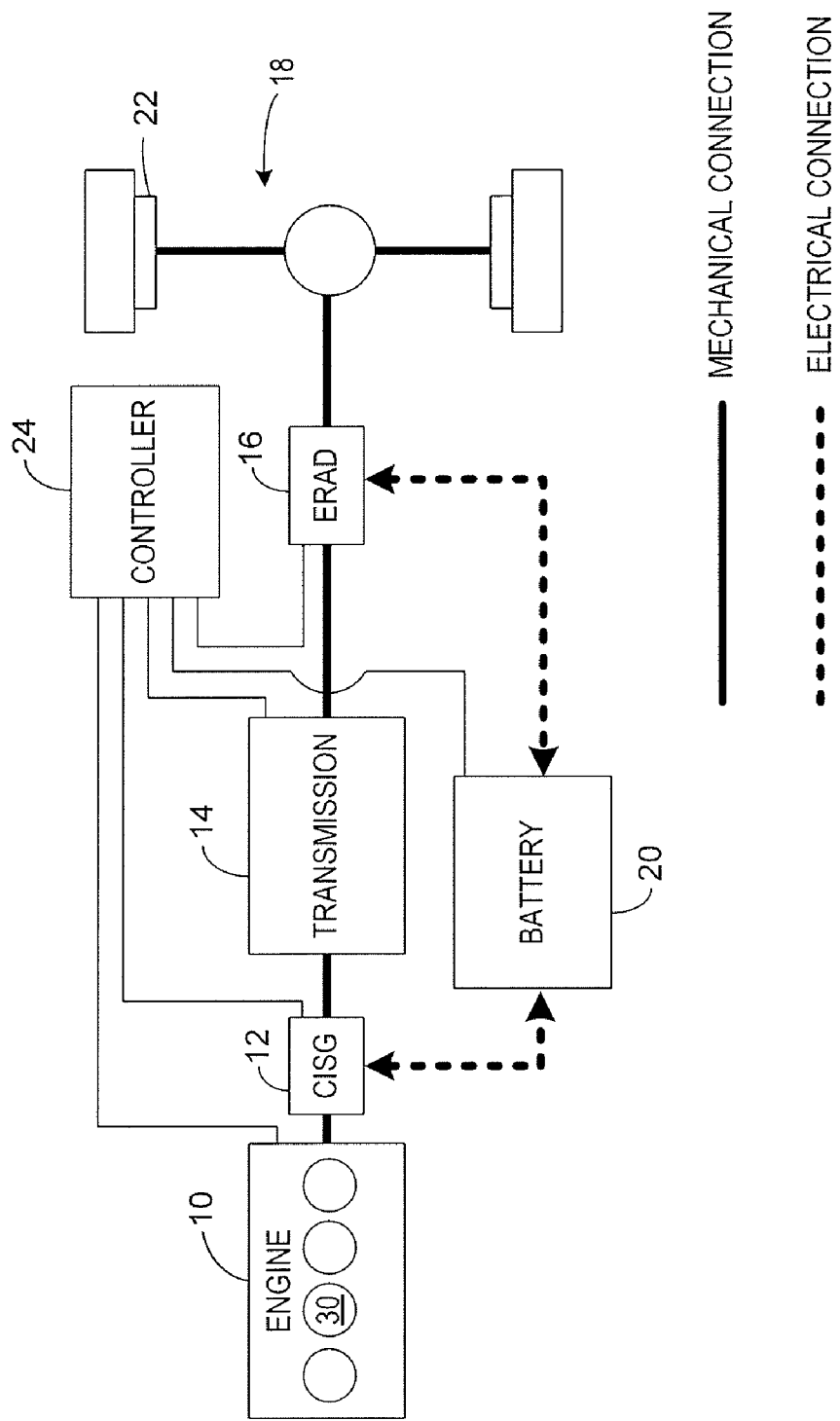
FIG. 1 shows a schematic diagram of an exemplary embodiment of a hybrid electric vehicle according to the present disclosure.

FIG. 1 illustrates an exemplary embodiment of a hybrid propulsion system for a vehicle. The hybrid propulsion configuration may be used with the disclosed approach for providing improved vehicle braking over an extended duration that maintains a high state of charge of the battery and reduces wear on the mechanical wheel brakes. In this example, the hybrid propulsion system may include an Atkinson cycle internal combustion engine (ICE) 10 having one or more cylinders 30, transmission 14, final drive/wheels 18 or other suitable device for delivering propulsive force to the ground surface, and two electric energy conversion devices 12 and 16. Each of wheels 18 may include wheel brake device 22.

Electric energy conversion devices 12 and 16 may operate as motors and convert electric energy into output torque. Further, electric energy conversion devices 12 and 16 may operate as generators and convert torque into electric energy. Note that electric energy conversion devices 12 and 16 may be referred to herein as at least one of a motor and a generator.

In one example, the first electric energy conversion device may be a crank integrated starter generator (CISG). CISG 12 may be connected at the output of engine 10 and further may be connected to transmission 14, thus providing starter/generator capabilities. In some embodiments, a torque converter may be disposed between the output of the CISG and the input of the transmission. The second electric energy conversion device may be an electric rear axle drive (ERAD) device. ERAD 16 may be coupled to the driveline downstream of the output of transmission 14 and may supply torque to final drive/wheels 18. In some embodiments, the ERAD may transmit torque to the driveline via a planetary gear set which may be connected to the final drive/wheels, thus providing propulsion capabilities in either an electric drive or hybrid drive mode. In some embodiments, the ERAD may transmit torque to the driveline via a drive belt or other suitable mechanism.

Electric energy conversion devices 12 and 16 may be in electric communication with battery 20. Under some conditions, electric energy conversion devices may generate output torque by converting electric energy supplied by the battery. In some embodiments, electric energy conversion devices 12 and 16 may be used as generators to convert mechanically generated power into electric energy to be stored in a battery. Optionally (or additionally) in some embodiments, electric energy may be stored in one or more capacitors (not shown).

Further, it should be appreciated that electric energy conversion devices 12 and 16 may be powered by sources other than the battery under some operating conditions. For example, IC engine 10 may generate power that may be used by the electric motors. Also, note in some embodiments, the ERAD electric energy conversion device may operatively communicate with gears configurations other than a planetary gear configuration.

In the illustrated configuration, the vehicle may be propelled by at least one of the engine or the motors. In this particular example, a rear wheel driveline configuration is shown, however it should be appreciated that other driveline configurations may be implemented, such as front wheel drive or all wheel drive. In other words, the IC engine, the CISG, and the ERAD may provide torque only to the front wheels. Alternatively, the three torque sources may provide torque to all of the wheels. In another example, the ERAD may generate torque to the front wheels and the CISG motor and IC engine may provide torque to the rear wheels or vice versa.

In some embodiments, the ERAD may be coupled downstream of the transmission. For example, the ERAD may be coupled directly to the output of the transmission. As another example, the ERAD may be coupled to the final drive/wheels. As yet another example, the ERAD may be coupled downstream of the transmission and may provide torque output via various gear sets, such as a planetary gear set, for example.

Note that the different torque sources may provide torque output to at least one of if not all of the wheels during various operating conditions. Moreover, in some embodiments, torque produced by the various torque sources may be distributed via different mechanical and/or electric paths to the different wheels based on various operating conditions.

While FIG. 1 shows one example hybrid propulsion configuration, various others may be used as noted herein. With regards to a full series type hybrid propulsion system, the engine may be operated to generate a form of energy suitable for use by the one or more motors. For example, with a full series type hybrid electric vehicle (HEV), the engine may generate electricity via a motor/generator that may be used to power an electric motor for propelling the vehicle. As another example, an engine may be operated to provide pump work to a hydraulic or pneumatic system that may be used to power a hydraulic or pneumatic motor for propelling the vehicle. As yet another example, an engine may be operated to provide kinetic energy to a flywheel or similar device for later application at the drive wheels.

With regards to a parallel type hybrid propulsion system, the engine and one or more motors may be operated independently of each other. As one example, an engine may be operated to provide torque to the drive wheels, while a motor (e.g. electric, hydraulic, etc.) may be selectively operated to add or remove torque delivered to the wheels. As another example, the engine may be operated without the motor or the motor may be operated without the engine.

Further, with either series or parallel type propulsion systems, or combinations thereof, an energy storage device may be included to enable energy generated by the engine and/or motor to be stored for later use by one or more motors. For example, a regenerative braking operation may be performed, where an electric energy conversion device (motor/generator) is used to convert kinetic energy at the drive wheels to a form of energy suitable for storage at the energy storage device. For example, with regards to a HEV, the motor or a separate generator may be used to convert torque at the wheels or torque produced by the engine into electric energy that may be stored at the energy storage device. A similar approach may be applied to other types of hybrid propulsion systems including hydraulic, pneumatic, or those including flywheels. Note that in some embodiments, separate motors and/or generators may be used to cooperatively generate electric power as well as output torque.

In the illustrated embodiment, electric energy conversion device 12 and electric energy conversion device 16 may be provided on each side of the transmission or on each side of a transmission element. In this example, one or more of electric energy conversion devices 12 and 16 may be operated to supply or absorb torque from the driveline with or without torque being provided by engine 10. Regenerative braking to charge battery 20 may be achieved with the configuration of FIG. 1 by transmitting torque from the drive wheels to electric energy conversion device 12 via the transmission, where electric energy conversion device 12 may perform an electric power generator function or alternatively electric energy conversion device 16 may perform an electric power generator function, further still both electric energy conversion devices may perform an electric power generator function to produce electric energy storable in the battery. Still other electric energy absorption and depletion configurations are possible.

An exemplary hybrid propulsion system may include one or more electronic control units shown as controller 24 to control operation of the hybrid driveline. The controller(s) may receive various signals from sensors distributed throughout the vehicle. A plurality of sensors may detect various operating conditions including engine and transmission operating conditions, battery and motor/generator operating conditions, and driver input, such as for example, engine speed (e.g. RPM), engine torque, CISG torque, ERAD torque, wheel torque, pedal position, battery state of charge, among others. The sensor signals may be processed and/or stored in the controller, and the controller may send various feedback control signals to actuators in the different vehicle systems based on calculations from the sensor signals in order to control vehicle operation.

In some embodiments vehicle operation may be controlled by a single electronic control unit. Further, in some embodiments different controllers may control different vehicle systems. For example, a controller may be designated to control aspects of the engine and/or transmission operation, while a different controller may be designated to control battery and electric power storage and output. In some embodiments, a vehicle may include a hierarchy of controllers which may collect, store, and process input signal information and further generate feedback control information. For example, one or more controllers may collect and store raw signal data and perform low level signal processing, such as signal enhancement, and various calculations. The processed signal data may be sent to one or more different controllers to perform additional processing and high level analysis as well as generate operational feedback. Alternatively, in some embodiments a single controller (or group of controllers) may control most if not all aspects of vehicle operation. Control of engine operation by controller 24 will be discussed in further detail below with reference to FIG. 2.

Figure 2:
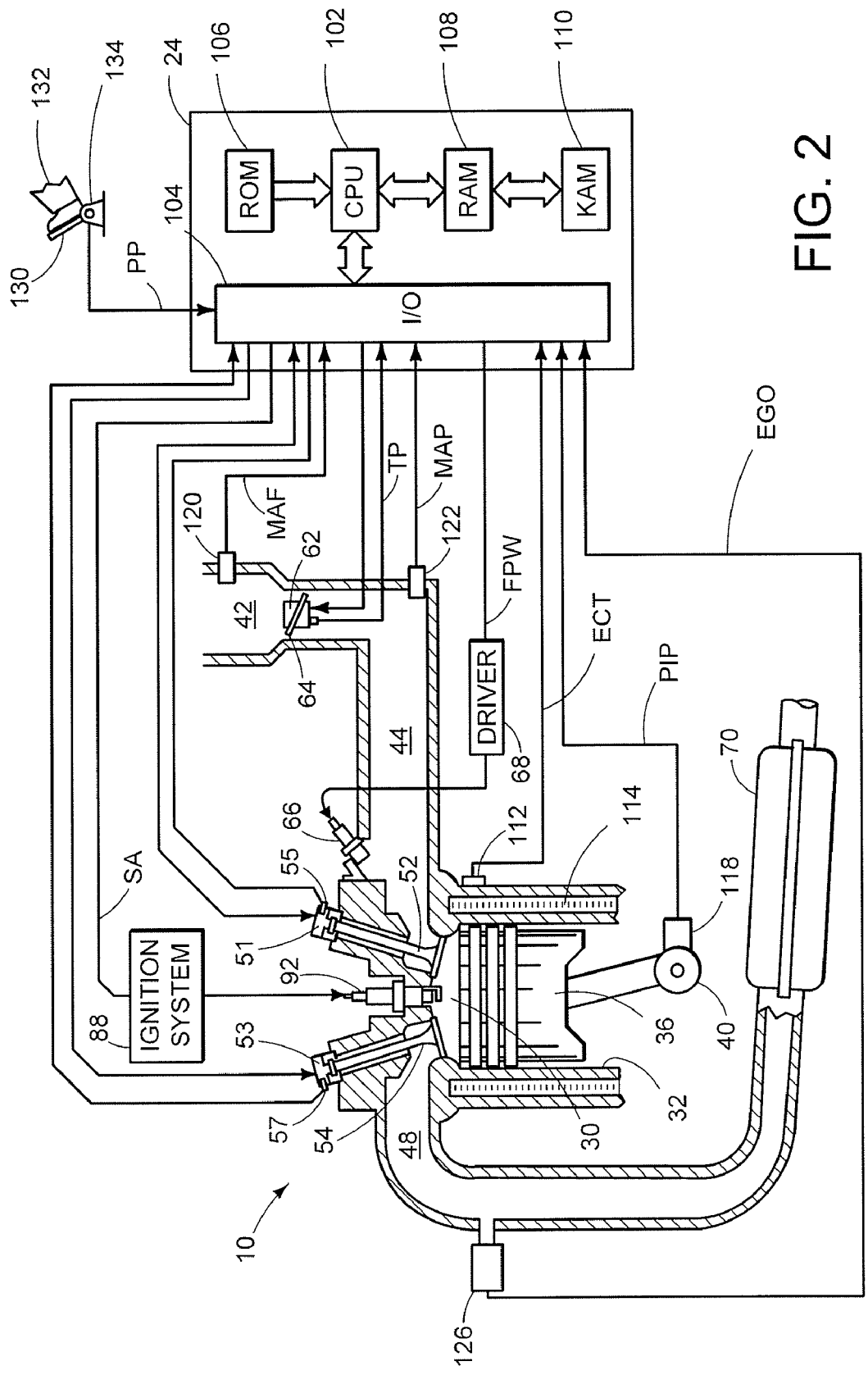
FIG. 2 shows a schematic diagram of an engine, intake system, and exhaust system of the vehicle of FIG. 1.

FIG. 2 is a schematic diagram showing one cylinder 30 of multi-cylinder engine 10, which may be included in a propulsion system of a hybrid electric vehicle as described above. Engine 10 may be controlled at least partially by a control system including controller 24 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 24 via electric valve actuator (EVA) 51. Similarly, exhaust valve 54 may be controlled by controller 24 via EVA 53. During some conditions, controller 24 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 24 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake manifold 42 may include a throttle 62 having a throttle plate 64. In this particular example, the position of throttle plate 64 may be varied by controller 24 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 24 by throttle position signal TP. Intake manifold 42 may include a mass air flow sensor 120 and a manifold air pressure sensor 122 for providing respective signals MAF and MAP to controller 24.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 24 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 24 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 24 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As discussed above in some embodiments, controller 24 may represent a plurality of control units for controlling various HEV systems by using operating parameters relating to the respective systems. For example, controller 24 may include control units for controlling operation of the operation, electric energy conversion devices, battery, transmission, brakes, etc. Further in some embodiments, a single control system or controller may control operation of the HEV systems.

It should be appreciated that FIG. 2 shows only one cylinder of a multi-cylinder engine, and that each cylinder may similarly include its own set of intake/exhaust valves, fuel injector, spark plug, etc.

The hybrid driveline configuration described in FIGS. 1 and 2 may provide output to meet driver demand in a flexible manner via variable operation of the IC engine, CISG motor and the ERAD motor. In other words, the driveline configuration may enable independent control of each of the electric energy conversion devices in terms of torque, speed, and efficiency. In particular, since the electric energy conversion devices are positioned upstream and downstream from the transmission, respectively, the electric energy conversion devices may generate or absorb torque independent of one another. Further, the driveline configuration may enable the electric energy conversion devices to be decoupled from the transmission with respect to torque transmission, so that torque may be generated upstream of the transmission without being transmitted through the driveline to the wheels.

For example, the ERAD may be coupled directly to the wheels, and the ERAD speed of rotation may be directly proportional to the vehicle speed. Thus, the ERAD may be operated in a torque control mode to command more or less negative torque to the wheels. On the other hand, the CISG may be commanded to operate at a speed independent of the vehicle speed since the CISG may be decoupled from the transmission input. The driveline configuration allows for operation of the electric energy conversion devices at different operating efficiencies which may be used to control hybrid operation of the vehicle with improved efficiency while meeting driver demand.

In one example, the driveline configuration may be advantageously controlled to perform a regenerative braking operation during a long period of deceleration. In particular, the above described driveline configuration may facilitate regenerative braking over an extended duration because the CISG and the ERAD may be mechanically separated and operated independently at different operating efficiencies in order to regulate a state of charge of the battery.

As discussed above, some hybrid electric vehicle configurations may control one or more generator/motor(s) to create negative torque to slow the vehicle during a deceleration period. The generator/motor(s) may, in turn, generate electric energy (e.g. charge (Q) or current (I)) from slowing the vehicle which may be transferred to a battery. This operation may be known as regenerative braking. However, regenerative breaking may be limited by the state of charge of the battery. In particular, during a deceleration period the battery may be quickly charged to capacity and cannot accept any additional energy. In other words, regenerative braking may be performed as long as the battery state of charge is not substantially full.

Furthermore, some hybrid electric vehicle configurations attempt to supplement the regenerative braking operation with engine braking to slow the hybrid electric vehicle during an extended period of deceleration. Under such conditions, the IC engine is started in order to provide engine compression braking. However, starting the engine may be noticeable to the driver, and may cause a momentary shift in vehicle performance and emissions. Moreover, operating the internal combustion engine for the purposes of engine compression braking may be inefficient with respect to fuel economy performance, as fuel is being used in order to slow the vehicle down rather than for propulsion.

In contrast, in the driveline configuration described in FIGS. 1 and 2, since the CISG and the ERAD may be mechanically separated and the electric energy conversion devices may be operated independently of each other, starting of the IC engine during an extended period of deceleration may be delayed or prevented. For example, under some conditions, the ERAD may be operated to meet the regenerative braking demands at the final drive/wheels. The regenerative braking operation may transfer current to the battery such that the state of charge of the battery may be substantially filled. In response to the battery state of charge being high, the CISG may be operated to use electric energy from the battery so that the ERAD may continue regenerative braking operation. During CISG operation torque may be provided to the IC engine to pump the cylinders without combustion. Operation of the CISG may be decoupled from the transmission input so that torque is not transmitted through the driveline. Furthermore, the operating efficiency of the CISG may be controlled to regulate current drawn from the battery to match the amount of current being generated by the ERAD in what may be known as a charge neutral state.

In this way, regenerative braking may be performed for an extended deceleration period without operating the IC engine. Accordingly, fuel consumption may be reduced and emissions may be improved. Moreover, by slowing a vehicle based on regenerative braking and engine compression braking, use of the wheel brakes may be reduced, which in turn, causes wear on the wheel brakes to be reduced.

Figure 3:
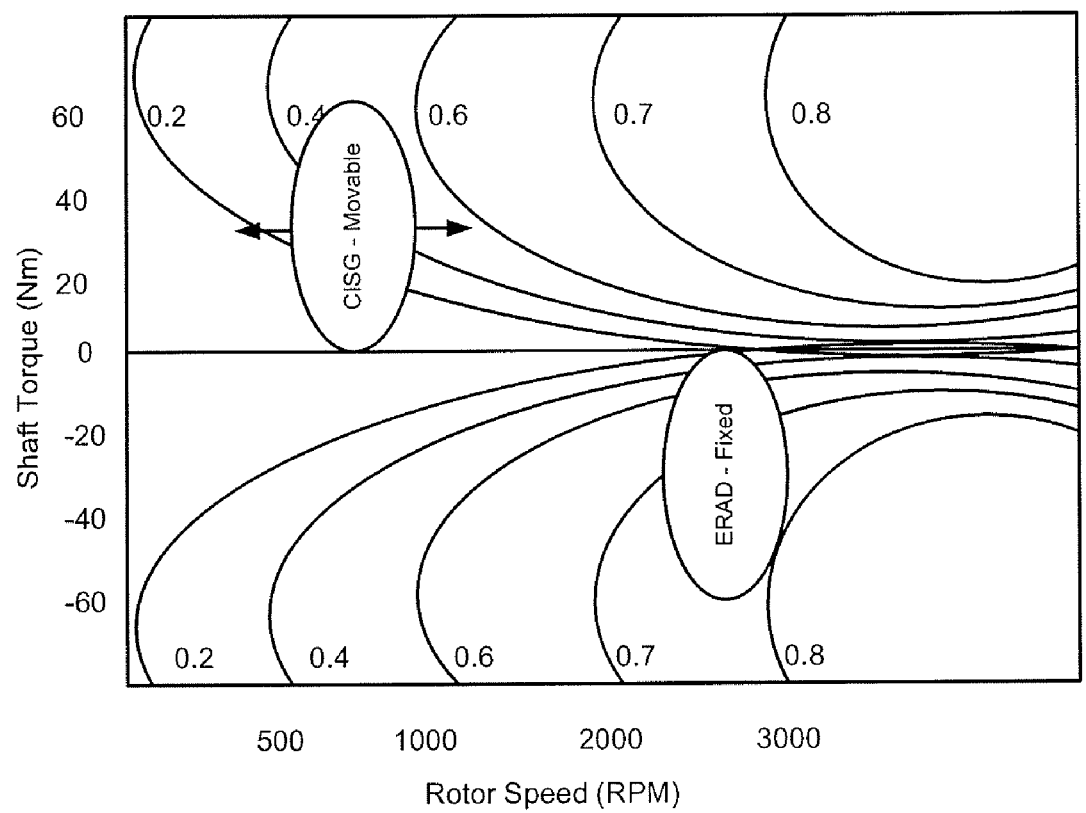
FIG. 3 graphically illustrates the operating efficiency of the electric energy conversion devices of the vehicle of FIG. 1 during an extended regenerative braking period.

Now turning to FIG. 3, a motor efficiency plot for motor torque vs. speed is shown. The plot graphically illustrates how operation of the electric energy conversion devices may be adjusted to control a state of charge of the battery in order to regeneratively brake the hybrid electric vehicle during an extended deceleration period. In the illustrated plot, the ERAD may be operated at a fixed operating efficiency or may be fixed along an efficiency curve. The operating efficiency may be based on the rotor speed (RPM) and shaft torque (Nm) of the ERAD which may be dictated by the vehicle speed and braking torque generated to meet driver demand. On the other hand, since the CISG can be operated independently of the ERAD, the CISG may be adjusted in response to charge (Q) generated by the ERAD, so that it can be positioned within a more or less efficient range (i.e. move between efficiency curves on the plot) to substantially match the ERAD charge and thus maintain battery state of charge. In particular, the speed of the CISG may be adjusted in order to adjust the operating efficiency to create a charge neutral state between the two electric energy conversion devices.

It should be appreciated that the CISG may not be operated or operated with a substantially low operating efficiency if the state of charge of the battery is not full in order to increase the state of charge of the battery. Further, actual ranges of operation of the electric energy conversion devices may be dependant upon the size of the electric energy conversion devices, and thus operation may be limited under some conditions. In some embodiments, CISG operation may be adjusted in conjunction with valve operation of the IC engine to further adjust operating efficiency and to provide engine compression braking. These brake strategies will be discussed in further detail below with reference to FIG. 4.

The specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated acts or functions may be repeatedly performed depending on the particular strategy being used. Further, these figures may graphically represent code to be programmed into the computer readable storage medium in a controller.

Figure 4:
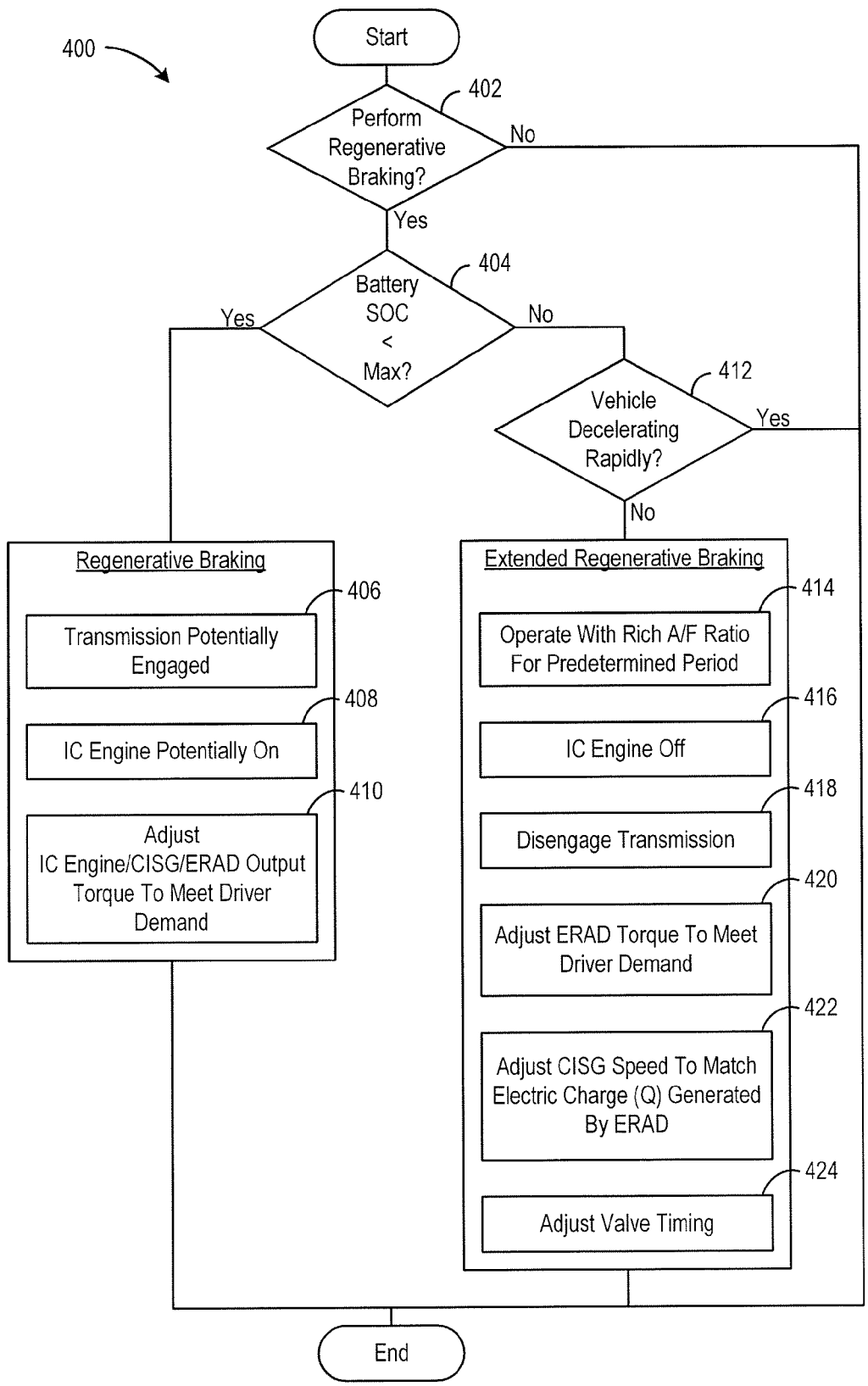
FIG. 4 shows a flow diagram of a control routine for providing a regenerative brake force to the vehicle of FIG. 1.

Referring now to FIG. 4, an example routine for performing an extended regenerative braking operation with a hybrid electric vehicle configured as described above is shown. Routine 400 may adjust a regenerative braking operation based on the state of charge of the battery. More specifically, routine 400 may determine if the state of charge of the battery is high and may adjust operation of the electric energy conversion devices to provide brake torque to the final drive/wheels and maintaining high battery state of charge via a charge neutral state of operation for an extended deceleration period. Further, the routine may adjust charge depletion based on the amount of regenerating braking performed and/or desired to control the state of charge within selected limits.

Routine 400 begins at 402, where it may be determined if it is desirable to perform regenerative braking operations. Regenerative breaking may be performed based on driver demand. In some embodiments, driver demand may be determined by a position of the accelerator pedal and/or the brake pedal which may be read by a pedal position sensor. In one particular example, regenerative braking may be performed based on the hybrid electric vehicle traveling above a threshold speed and vehicle operator releasing the accelerator pedal. If it is determined that regenerative braking operations are not desired routine 400 ends. Otherwise, if it is determined that regenerative braking operations are desired routine 400 moves to 404.

At 404, it may be determined if the state of charge (SOC) of the battery is above a calibratible level that is indicative of the battery being substantially full or having a high SOC. This arbitration may determine whether to collect electric energy via regenerative braking using either one of or both of the CISG and ERAD to increase the battery SOC, or whether an extended regenerative braking event is occurring at which point the ERAD may collect electric energy while providing brake torque and the CISG may expend excess energy by spinning the engine. If it is determined that the battery SOC is below a threshold level, routine 400 moves to 406 and regenerative braking operation is initiated. Otherwise, it is determined that the battery state of charge meets or exceeds a threshold level and the battery is substantially filled to capacity so routine 400 moves to 412 to perform extended regenerative braking.

At 406, it has been determined that the battery SOC is less than a maximum calibratible level, thus in order to increase the battery SOC regenerative braking may be performed to generate electric energy which may be stored in the battery. Accordingly, at 406, under some conditions, the transmission may be engaged with the upstream electric energy conversion device and the IC engine and negative or brake torque generated by the engine and upstream electric energy conversion device may be transmitted to the final drive/wheels to decelerate the vehicle.

Next at 408, under some conditions, the IC engine may be started in order to provide engine compression braking which may be used in conjunction with brake torque from the upstream and downstream electric energy conversion devices. Further, under some conditions, operation of the IC engine may not be required to provide torque to decelerate the vehicle as desired. Accordingly, under such conditions, the IC engine may not be started.

Next at 410, the torque output of the IC engine, the upstream electric energy conversion device, and/or the downstream electric energy conversion device may be adjusted to meet desired vehicle deceleration. The brake torque produced by the electric energy conversion devices may be used to decelerate the vehicle which in turn may generate electric energy which may be stored in the battery until a maximum calibratible SOC level is reached.

Regenerative braking may be performed until the vehicle is decelerated to a desired speed or until the battery reaches the calibratible SOC level. Under some conditions, where a large brake force/rate is desired, regenerative braking may be performed in conjunction with operation of the wheel brakes to decelerate the vehicle at a desired rate beyond the regenerative braking capabilities of the hybrid elements of the vehicle driveline.

Continuing with routine 400, at 412, it has been determined that the battery SOC is above the maximum calibratible level, and it may be determined if the vehicle is decelerating above a predetermined rate or that driver demand requests rapid deceleration of the vehicle. Rapid deceleration may indicate that the diver wishes to bring the vehicle to a stop, in which case no additional regenerative braking strategy is employed. If it is determined that the vehicle is decelerating rapidly or that the driver demand requests rapid deceleration of the vehicle, then regenerative braking may not be employed and routine 400 ends. Otherwise, if it is determined that the vehicle is not decelerating rapidly or driver demand does not indicate a desired rapid deceleration, then extended regenerative braking may be performed and routine 400 moves to 414.

Extended regenerative braking may be performed by operating the two electric energy conversion devices in conjunction so that a desired amount of brake torque may be produced and a high battery SOC may be maintained. In particular, the upstream electric energy conversion device may be operated to use current from the battery equal to the amount of current generated by the downstream electric energy conversion device. During extended regenerative braking, the upstream electric energy conversion device may generate torque that is applied to then engine. Torque applied to the engine may cause the cylinders in the engine to pump air since no combustion occurs. The air pumped from the cylinder may travel through the exhaust system causing emissions control device(s) to become loaded with oxygen. Over time, the oxygen loaded emissions control devices may not efficiently convert emissions which may cause an increase in emissions released to the atmosphere.

Accordingly, at the beginning and/or end of extended regenerative braking or upon detection of an extended deceleration period, the IC engine may be adjusted to operate rich for a predetermined period. In other words, the air-fuel ratio may be adjusted so that additional fuel may be combusted and the emissions control device(s) may be biased such that oxygen stored in the catalyst may be used to control emissions prior to oxygen being provided to the emissions control device(s) during extended regenerative braking. Thus, at 414, the IC engine may be operated with a rich air-fuel fuel ratio for a predetermined period prior to, at the beginning of the extended deceleration period, or at an end of extended deceleartion. In this way, the emissions control device(s) may be prepared to have the capacity to contain air pumped during the extended regenerative braking process. Further, by operating rich, the emission control device(s) facilitate lean operation of the IC engine upon restart since the emission control device(s) may have capacity to store additional oxygen. Under some conditions, the IC engine may not be operated with a rich air-fuel ratio is the emissions control device(s) are already biased (or loaded) as a result of vehicle operation. Further, in some embodiments, operating the IC engine with a rich air-fuel ratio may be omitted from the control routine.

Continuing with routine 400, at 416, the internal combustion engine fuel injection is deactivated so that no combustion occurs. The upstream electric energy conversion device may rotate the IC engine may (i.e. the cylinders may pump air without injected fuel) to use an amount of charge from the battery that equates with the amount of charge generated by the downstream electric energy conversion device while producing brake torque to decelerate the vehicle. By deactivating the engine, fuel economy performance during extended regenerative braking may be improved since no combustion occurs.

Next at 418, the transmission may be disengaged from the upstream electric energy conversion device so that the upstream electric energy device may operate without transmitting torque through the driveline to the wheels. Since the upstream electric energy conversion device may be disengaged for the transmission and may produce torque output independently from the downstream electric energy device, the two electric energy conversion devices may be operated in conjunction to create a charge neutral state that facilitates regenerative braking over an extended period. In particular, the upstream electric energy conversion device speed may be adjusted to achieve an operating efficiency that uses approximately the same amount of charge that is produced by the downstream electric energy conversion device as a result of creating brake torque to meet driver demanded deceleration.

Next at 420, the downstream electric energy conversion device may be adjusted to meet desired deceleration condition. In particular, the downstream electric energy conversion device may be adjusted to produce negative torque or brake torque to the wheels to decelerate the vehicle at a desired rate or to a desired speed. In some embodiments, the desired deceleration condition may be based on driver demand detected based on brake pedal position. In some embodiments, desired deceleration condition may be based on another operating condition, such as for example, vehicle speed, detected road grade, etc. Referring back to FIG. 3, in this example, the downstream electric energy conversion device (e.g. ERAD) may be adjusted based on the vehicle speed and braking torque necessary to meet a desired deceleration condition (or driver demand). Under extended regenerative braking conditions, the ERAD may be operated at a fixed efficiency level that may be dictated by the desired deceleration condition.

In some cases, where the desired deceleration condition is beyond the brake torque producing capability of the downstream electric energy conversion device, the wheel brakes may be applied to the wheels in conjunction with the brake torque to decelerate the vehicle. In one particular example, the vehicle may be descending down a particularly steep grade where a large brake force is required to maintain a desired vehicle speed for an extended period. Under such conditions, deceleration of the vehicle may be facilitated by a combination of brake force from the wheel brakes and brake torque produced by the downstream electric energy conversion device. In this way, a desired vehicle speed may be maintained over an extended decent even at a steep grade.

Continuing with routine 400, at 422, the upstream electric energy conversion device may be adjusted to operate at an efficiency level that draws an amount of current from the battery equal to the amount of current generated by the downstream electric energy conversion device such that a charge neutral state exists. Referring back to FIG. 3, in this example, the upstream electric energy conversion device (e.g. CISG) may be adjusted to operate at an efficiency level that creates a charge neutral state with the downstream electric energy conversion device (e.g. ERAD). Thus, as the ERAD is adjusted to meet a desired deceleration condition that causes a change in current generation, the operating efficiency of the CISG may be adjusted to match the change in current production in order to maintain a charge neutral state. In other words, the CISG operation may be moved horizontally across the efficiency ranges shown in FIG. 3 until the charge dissipated by the CISG is equal to or may track within limits the charge produced by the ERAD. By creating and maintain a charge neutral state when the battery SOC is high during an extended regenerative braking condition, vehicle deceleration may be provided via brake torque from the ERAD over an extended period. In other words, since the CISG uses battery charge equal to the amount of charge created by the ERAD as a result of braking the vehicle, the battery may not be filled to capacity and regenerative braking may be conducted over an extended period.

In some embodiments, the efficiency level of the upstream electric energy conversion device may be adjusted by changing the rotation speed of the motor/generator. In some embodiments, the efficiency of the electric energy conversion device may be adjusted by changing the shaft torque of the motor/generator.

As discussed above, during an extended regenerative braking period as road conditions change (e.g. changes in road grade) the desired deceleration condition may change and the downstream electric energy conversion device may be adjusted to meet the desired deceleration condition. Under some conditions, where a substantial change in the deceleration condition occurs, the downstream electric energy conversion device may be adjusted causing a substantial change in generated current. In order to maintain a charge neutral state, the operating efficiency of the upstream electric energy conversion device may be adjusted to match the current.

In some embodiments, to facilitate a charge neutral state the valve timing of the IC engine may be adjusted in conjunction with the operating efficiency of the upstream electric energy conversion device. In particular, the valve timing of the engine may be adjusted to increase pumping losses generated as a result of spinning the IC engine. The increased pumping losses may increase the torque required to spin the IC engine, which in turn, may cause the upstream electric energy conversion device to use more current. In one particular example, when a large amount of current is being generated by the downstream electric energy conversion device, the intake valve timing may be delayed to create valve overlap so that vacuum is created in the cylinders that may substantially maximize pumping losses as the engine spins so that the upstream electric energy conversion device may maintain a charge neutral state. Thus, under some conditions by adjusting the valve timing of the IC engine the amount of current consumed by the upstream electric energy conversion device may be increased in order overcome a substantial difference in charge so that a charge neutral state may be maintained and regenerative braking may be performed over an extended period even under changing road conditions Continuing with routine 400 at 424, the valve timing of the intake and/or exhaust valves of the IC engine may be adjusted to change the generated pumping forces to facilitate maintaining a charge neutral state. It should be appreciated that under some conditions where the upstream electric energy device uses less current the valve timing may be adjusted to decrease pumping losses and under some conditions where the upstream energy device uses more current the valve timing may be adjusted to increase pumping losses. In some embodiments, the valve timing may be adjusted to fine tune corrections in operating efficiency and/or an amount of consumed current. Note that in some embodiments, adjusting the valve timing of the IC engine during an extended regenerative braking period may be omitted. Further, in some embodiments, the valve timing of the IC engine may be adjusted as part of standard regenerative braking operations.

Regenerative braking may be performed until the deceleration conditions changes to a rapid vehicle deceleration beyond or until vehicle deceleration is no longer desired and routine 400 ends. It should be appreciated that the control routine may be performed repeatedly throughout vehicle operation.

Control routine 400 may control the hybrid powertrain to provide regenerative braking to decelerate the hybrid vehicle in response to a deceleration condition and may take advantage of the hybrid driveline configuration to provide regenerative braking over an extended period while maintaining a high battery SOC. In particular, since the two electric energy conversion devices may be decoupled from each other, and the upstream electric energy conversion device may be decoupled from the wheels, both devices may be operated to meet the desired deceleration condition while creating a charge neutral state. In this way, the hybrid electric vehicle may be decelerated via regenerative braking even for an extended period thus reducing wear on the wheel brakes.

Moreover, the control routine advantageously improves fuel economy performance during extended regenerative braking by decoupling the upstream electric energy device from the transmission input and spinning the IC engine without combustion to draw current from the battery equal to the amount of current be produced as a result of the regenerative braking. Further, by adjusting the valve timing of the IC engine during extended regenerative braking pumping losses may be modified to fine tune the adjustments to current being drawn from the battery. Additionally, under conditions where a large amount of current is being generated as a result of regenerative braking, adjusting the valve timing to increase pumping losses may extended the effective operational range of the upstream electric energy conversion device to maintain a charge neutral state.

The control routine may advantageously maintain oxygen storage capacity in the emissions control device(s) during extended regenerative braking by biasing the emissions control device(s) with hydrocarbons prior to or at the beginning of extended regenerative braking. In particular, the control routine may operate the IC engine with a rich air-fuel ratio in order to increase the available capacity for oxygen pumped from the cylinder as a result of the IC engine being rotated during extended regenerative braking. In this way, the emissions control device(s) may facilitate lean operation of the IC engine upon restart which may improve fuel economy performance.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of generating brake force to decelerate a vehicle comprising an internal combustion engine coupled to an input of a first electric energy device, the first electric energy device having an output coupled to a transmission device, and a second electric energy conversion device coupled between the transmission device and a wheel, the first and second electric energy conversion devices being powered at least by a battery, the method comprising:
during a deceleration condition, operating the second electric energy conversion device at a first speed to generate brake torque via the second electric energy conversion device to generate electric energy storable in the battery; while
rotating the internal combustion engine via torque output from the first electric energy device at a second speed, the second speed independent of the first speed, to create a charge neutral state between the first and second electric energy conversion devices and deplete an amount of electric energy from the battery.

2. The method of claim 1 further comprising:
decoupling the output of the first electric energy conversion device from the transmission device.

3. The method of claim 1 further comprising:
adjusting the internal combustion engine to operate at a rich fuel-air ratio for a predetermined period prior to deactivating fuel injection.

4. The method of claim 1 further comprising:
deactivating injection of fuel into at least one cylinder of the internal combustion engine during the deceleration condition.

5. The method of claim 4 further comprising:
adjusting a valve timing of at least one of an intake valve and an exhaust valve of the at least one cylinder to adjust the amount of electric energy being depleted from the battery.

6. The method of claim 1 wherein the deceleration condition is based on a position of at least one of an accelerator pedal and a brake pedal of the vehicle.

7. The method of claim 1 wherein the first electric energy conversion device rotates the internal combustion engine when a state of charge of the battery is above a threshold level.

8. A method of generating brake force to decelerate a vehicle comprising an internal combustion engine coupled to a first electric energy conversion device, a transmission device having an input and an output, the input coupled to the first electric energy conversion device, a second electric energy conversion device coupled between the output of the transmission device and at least one wheel, the second electric energy device providing torque output to at least one wheel and a battery for powering at least the first electric energy conversion device and the second electric energy conversion device, the method comprising:
during a first mode of operation,
adjusting at least one of the first electric energy conversion device and the second electric energy conversion device to produce brake torque to the at least one wheel; and
storing electric energy produced from the brake torque in the battery; and during a second mode of operation,
adjusting the second electric energy conversion device to produce brake torque to the at least one wheel, the second electric energy conversion device operating at a first speed dictated by vehicle speed and braking torque to meet driver demand;
storing electric energy produced by the second electric energy conversion device in the battery; and
adjusting the first electric energy conversion device to produce torque to rotate the internal combustion engine to deplete electric energy from the battery at a second speed, the second speed independent of the first speed.

9. The method of claim 8 further comprising:
during the second mode of operation, decoupling the input of the transmission device from the first electric energy conversion device.

10. The method of claim 8 further comprising:
during a third mode of operation, operating the first electric energy conversion device and the second electric energy conversion device as electric power generators to produce brake torque to the at least one wheel.

11. The method of claim 10 further comprising:
switching from the third mode of operation to the second mode of operation based on a state of charge of the battery being above a threshold level.

12. The method of claim 8 further comprising:
during the second mode of operation, deactivating fuel injection into at least one cylinder of the internal combustion engine.

13. The method of claim 12 further comprising:
adjusting valve timing of at least one of an intake valve and an exhaust valve of the at least one cylinder to adjust an amount of electric energy being depleted from the battery.

14. A method of generating brake force to decelerate a vehicle comprising an internal combustion engine coupled to a first electric energy conversion device, a transmission device having an input and an output, the input coupled to the first electric energy conversion device, a second electric energy conversion device coupled between the output of the transmission device and at least one wheel, the second electric energy device providing torque output to at least one wheel and a battery for powering at least the first electric energy conversion device and the second electric energy conversion device, the method comprising:
during a first mode of operation,
adjusting at least one of the first electric energy conversion device and the second electric energy conversion device to produce brake torque to the at least one wheel; and
storing electric energy produced from the brake torque in the battery; and
during a second mode of operation,
adjusting the second electric energy conversion device to produce brake torque to the at least one wheel;
storing electric energy produced by the second electric energy conversion device in the battery;
adjusting the first electric energy conversion device to produce torque to rotate the internal combustion engine to deplete electric energy from the battery;
adjusting an air-fuel ratio of the internal combustion engine to operating rich for a predetermined period prior to deactivating fuel injection; and
deactivating fuel injection into at least one cylinder of the internal combustion engine.

15. A method of generating brake force to decelerate a vehicle comprising an internal combustion engine coupled to a first electric energy conversion device, a transmission device having an input and an output, the input coupled to the first electric energy conversion device, a second electric energy conversion device coupled between the transmission and a wheel, a battery for powering at least the first electric energy conversion device and the second electric energy conversion device, the method comprising:
adjusting a torque output of the second electric energy conversion device to meet a desired deceleration condition and thereby generate electric energy;
decoupling the first electric energy conversion device from the transmission input; and
adjusting an operating efficiency of the first electric energy conversion device independent of the second electric energy conversion device to draw an amount of electric energy from the battery that is based on the amount of electric energy generated by the second electric energy conversion device when a battery state of charge is beyond a threshold level.

16. The method of claim 15 further comprising:
adjusting at least one of a torque output of the first electric energy conversion device and the torque output of the second electric energy conversion device to meet the desired deceleration condition when the battery state of charge is below the threshold level.

17. The method of claim 15 wherein adjusting the operating efficiency of the first electric energy conversion device further comprises:
adjusting a rotor speed of the first electric energy conversion device independent of a speed of the second electric energy conversion device.

18. The method of claim 15 wherein the desired deceleration condition is based on a position of at least one of an accelerator pedal and a brake pedal of the vehicle.

19. The method of claim 15 wherein the threshold level is a substantially high battery state of charge.

20. The method of claim 15 wherein the deceleration condition does not include rapid deceleration of the vehicle.

* * * * *